(12) United States Patent
Kawakami (10) Patent No.: US 9,809,278 B2
(45) Date of Patent: Nov. 7, 2017

(54) APPARATUS FOR REDUCING AN ENGAGING FORCE OF AN ENGAGING MEMBER

(75) Inventor: Tatsuya Kawakami, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 2247 days.

(21) Appl. No.: 10/711,611

(22) Filed: Sep. 28, 2004

(65) Prior Publication Data

US 2006/0070484 A1    Apr. 6, 2006

(51) Int. Cl.
  *G05G 5/06* (2006.01)
  *B62M 25/04* (2006.01)
  *B62K 23/06* (2006.01)

(52) U.S. Cl.
  CPC ............. *B62M 25/04* (2013.01); *B62K 23/06* (2013.01); *Y10T 74/20636* (2015.01)

(58) Field of Classification Search
  CPC ....... B62K 23/06; B62M 25/06; B62M 25/04; Y10T 74/20636
  USPC .......... 74/501.6, 473.14, 577 R, 502, 2, 542, 74/512; 474/80
  See application file for complete search history.

(56) References Cited

U.S. PATENT DOCUMENTS

| | | | | |
|---|---|---|---|---|
| 3,659,808 A | * | 5/1972 | Fleischer | 242/299 |
| 3,915,029 A | * | 10/1975 | Shimada | 74/502.2 |
| 4,138,905 A | * | 2/1979 | Konishi | 74/577 R |
| 4,186,291 A | * | 1/1980 | Swanson | 200/61.86 |
| 4,232,564 A | * | 11/1980 | Yamasaki | 74/473.13 |
| 4,343,201 A | * | 8/1982 | Shimano | 74/473.14 |
| 4,667,459 A | * | 5/1987 | Scanland et al. | 56/11.3 |
| 4,731,046 A | * | 3/1988 | Juy | 474/80 |
| 5,009,629 A | * | 4/1991 | Tagawa | 474/80 |
| 5,044,213 A | * | 9/1991 | Nagano | 74/142 |
| 5,102,372 A | | 4/1992 | Patterson et al. | |
| 5,197,927 A | | 3/1993 | Patterson et al. | |
| 5,203,213 A | * | 4/1993 | Nagano | 74/473.14 |
| 5,355,745 A | * | 10/1994 | Wu et al. | 74/502.2 |
| 5,400,675 A | * | 3/1995 | Nagano | 74/502.2 |
| 5,666,859 A | | 9/1997 | Arbeiter et al. | |
| 5,673,594 A | * | 10/1997 | Huang et al. | 74/473.13 |
| 5,676,020 A | | 10/1997 | Jordan et al. | |
| 5,752,414 A | * | 5/1998 | Reasoner et al. | 74/483 R |

(Continued)

FOREIGN PATENT DOCUMENTS

DE    31 36922 A1 *  3/1983    ............. B62K 23/06
DE    9015515.7 U1    5/1991

(Continued)

OTHER PUBLICATIONS

Hooke's law—Ask.com Encyclopedia; htt://www.ask.com/wiki/Hooke's_law; Apr. 1, 2014.*

(Continued)

*Primary Examiner* — Vinh Luong
(74) *Attorney, Agent, or Firm* — James A. Deland (57) ABSTRACT

An apparatus for reducing an engaging force of an engaging member for a bicycle component comprises a first engaging member and a movable second engaging member, wherein the first engaging member engages the second engaging member. A biasing mechanism applies a biasing force to bias the first engaging member and the second engaging member towards each other, wherein the biasing mechanism reduces the biasing force when the second engaging member moves.

33 Claims, 7 Drawing Sheets

(56) References Cited

U.S. PATENT DOCUMENTS

| | | | |
|---|---|---|---|
| 5,775,174 A * | 7/1998 | Kanbe et al. | 74/542 |
| 5,791,195 A * | 8/1998 | Campagnolo | 74/473.14 |
| 5,806,372 A * | 9/1998 | Campagnolo | 74/473.14 |
| 5,829,313 A * | 11/1998 | Shahana | 74/502.2 |
| 6,105,459 A * | 8/2000 | Troiano | 74/542 |
| 6,145,407 A | 11/2000 | Rottmann | |
| 6,279,713 B1 * | 8/2001 | Young et al. | 192/219.5 |
| 6,497,163 B2 * | 12/2002 | Liu et al. | 74/502.2 |
| 6,508,341 B1 * | 1/2003 | Hiura | 188/265 |
| 6,553,860 B2 * | 4/2003 | Blaschke | 74/501.6 |
| 6,792,826 B2 * | 9/2004 | Dal Pra' | 74/502.2 |
| 6,810,764 B2 * | 11/2004 | Chen | 74/502.2 |
| 6,862,948 B1 * | 3/2005 | Calendrille, Jr. | 74/502.2 |
| 7,194,931 B2 * | 3/2007 | Wessel | 74/577 M |
| 7,669,502 B2 * | 3/2010 | Kawakami | 74/502.2 |
| 7,762,157 B2 * | 7/2010 | Kawakami | 74/502.2 |
| 2006/0016288 A1 * | 1/2006 | Kawakami | 74/502.2 |
| 2007/0234840 A1 * | 10/2007 | Ferenc et al. | 74/512 |
| 2008/0115617 A1 * | 5/2008 | Lesche | 74/502.2 |

FOREIGN PATENT DOCUMENTS

| | | | |
|---|---|---|---|
| DE | 19734682 | A1 | 2/1999 |
| EP | 0714826 | A2 | 6/1996 |

OTHER PUBLICATIONS

European search report for EP 05008926, the European application that corresponds to this application, dated Sep. 26, 2006.

\* cited by examiner

APPARATUS FOR REDUCING AN ENGAGING FORCE OF AN ENGAGING MEMBER

BACKGROUND OF THE INVENTION

The present invention is directed to bicycles and, more particularly, to an apparatus for reducing an engaging force of an engaging member in a bicycle component such as a shift control device.

Shift control devices are used to shift bicycle transmissions from one gear ratio to another. One type of shift control device shown in U.S. Pat. No. 5,400,675, for example, comprises first and second levers that operate a wire spooling device, wherein the first lever is moved from a rest position to an operating position to wind a transmission control wire around the wire spooling device, and the second lever is moved from a rest position to an operating position to unwind the transmission control wire from the wire spooling device. The wire spooling device comprises a cylindrical wire spooling member having a wire winding groove for winding and unwinding the transmission control wire, a plurality of drive teeth circumferentially disposed around the outer peripheral surface of the wire spooling member, and a plurality of positioning teeth also circumferentially disposed around the outer peripheral surface of the wire spooling member. The wire spooling member is biased in a wire unwinding direction by a return spring. A drive pawl is mounted to the first lever for pressing against one of the plurality of drive teeth in response to rotation of the first lever from the rest position to the operating position to thereby rotate the wire spooling member in a wire winding direction, and a positioning pawl selectively engages one of the positioning teeth to hold the wire spooling member in a desired rotational position. The positioning pawl is biased toward the positioning teeth by a pawl spring. The second lever is operated from the rest position to the operating position to selectively engage and disengage the positioning pawl to allow the wire spooling member to rotate in the wire unwinding direction in accordance with the biasing force of the return spring.

When the first lever is rotated to rotate the wire spooling member, the movement must overcome not only the biasing force of the return spring but also the frictional force of the positioning pawl caused by the pawl spring. The frictional force of the positioning pawl increases as the positioning pawl rises over the positioning teeth in response to rotation of the wire spooling member, and the rider must increase the force applied to the first lever accordingly.

SUMMARY OF THE INVENTION

The present invention is directed to various features of a shift control device for a bicycle transmission. In one embodiment, an apparatus for reducing an engaging force of an engaging member for a bicycle component comprises a first engaging member and a movable second engaging member, wherein the first engaging member engages the second engaging member. A biasing mechanism applies a biasing force to bias the first engaging member and the second engaging member towards each other, wherein the biasing mechanism reduces the biasing force when the second engaging member moves.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
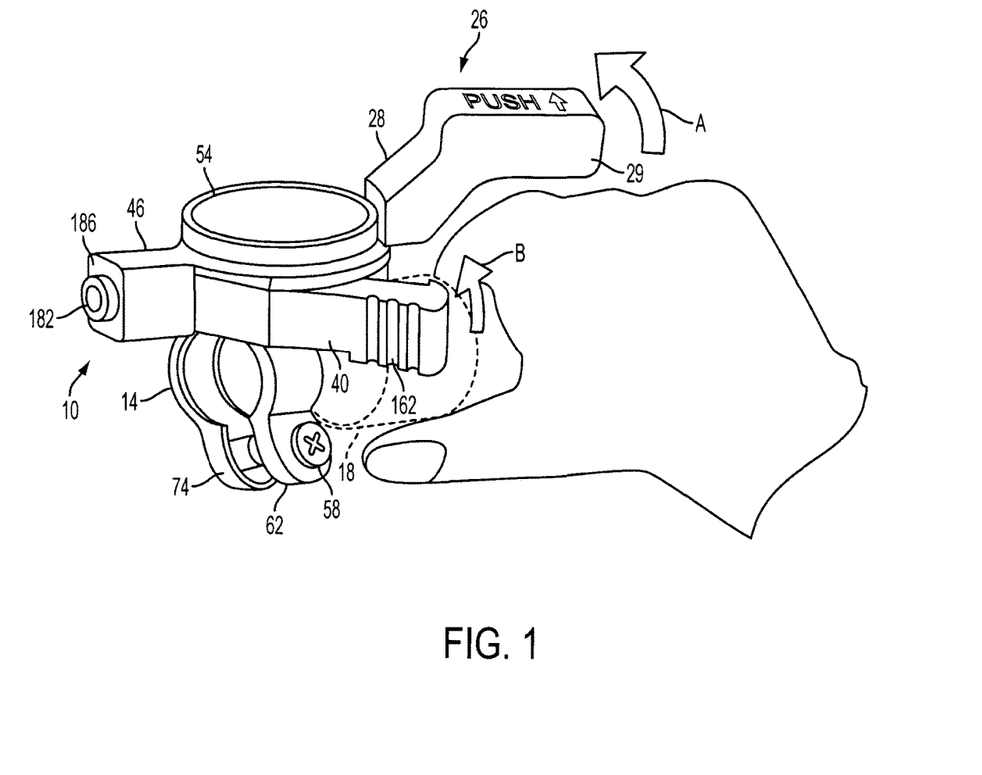
FIG. 1 is an elevational view of a particular embodiment of a shift control device for a bicycle transmission.
Figure 2:
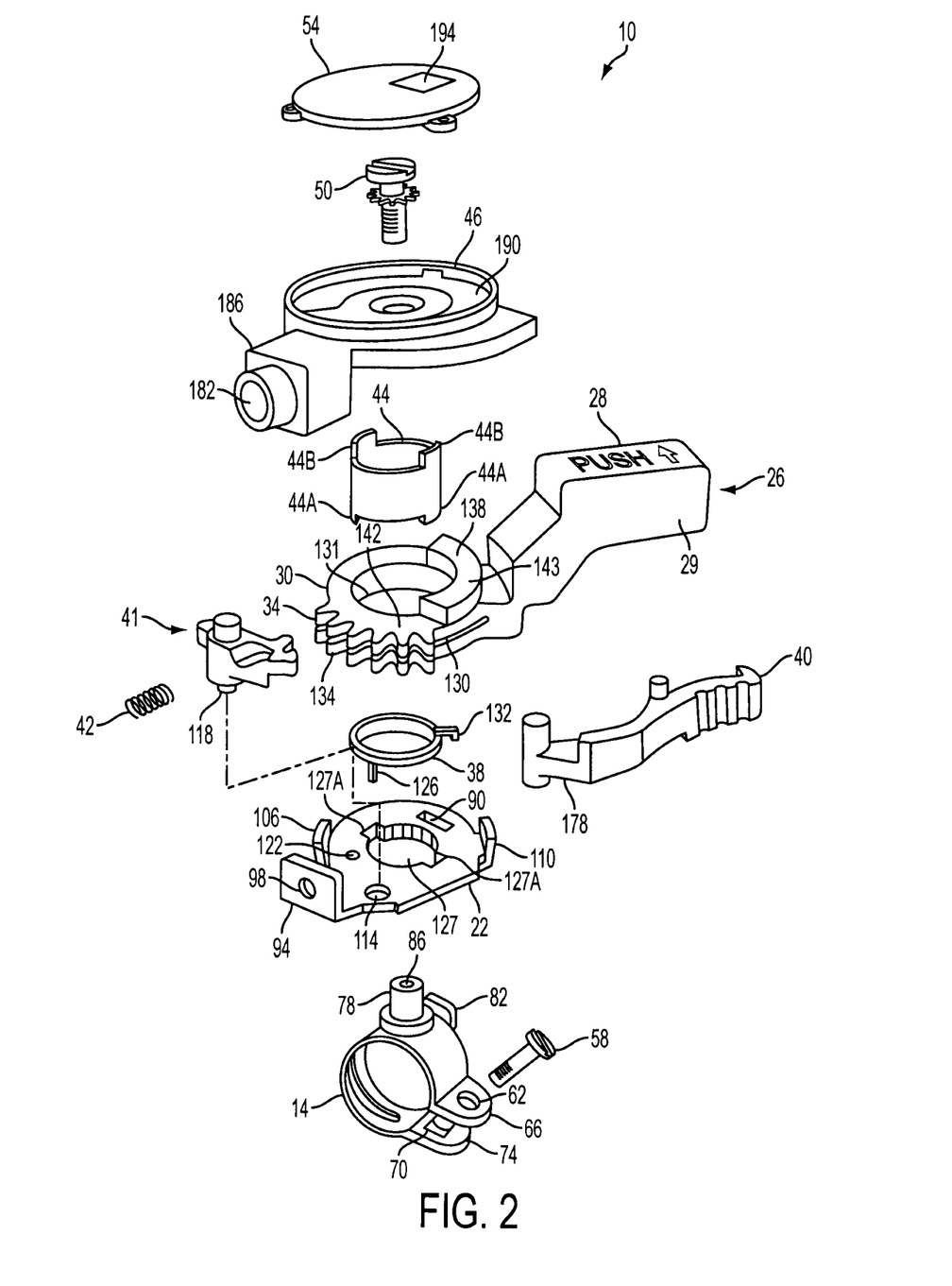
FIG. 2 is an exploded view of the shift control device.

FIG. 1 is an elevational view of a particular embodiment of a shift control device 10 that may be used with a bicycle transmission, for example, and FIG. 2 is an exploded view of shift control device 10. Shift control device 10 comprises an attachment band 14 that fastens shift control device 10 to a handlebar 18; a mounting member such as a base plate 22; a winding lever assembly 26 comprising an integrally formed operating member such as a first lever such as a winding lever 28, a takeup element 30 and a positioning unit such as a positioning ratchet 34; a return spring 38 for biasing winding lever assembly 26 in a wire releasing (unwinding) direction; a second lever such as a release lever 40, a positioning member in the form of a positioning pawl 41, a pawl bias spring 42, a bushing 44 for rotatably supporting winding lever assembly 26, a cover plate 46, an assembly screw 50 for fixing attachment band 14, base plate 22, winding lever assembly 26, bushing 44 and cover plate 46 together, and a top plate 54 that attaches to cover plate 46.

Attachment band 14 fastens shift control device 10 to handlebar 18 in a conventional manner using a screw 58 that passes though an opening 62 in one attachment ear 66 and screws into a threaded opening 70 in another attachment ear 74. Attachment band 14 also includes a support post 78 and a base plate fixing flange 82. Support post 78 includes a threaded opening 86 for receiving assembly screw 50, and base plate fixing flange 82 engages a slot 90 in base plate 22 for nonrotatably fixing base plate 22 to attachment band 14.

Base plate 22 includes an upstanding cable guide flange 94 with a cable guide opening 98 for receiving an inner cable 102 (FIG. 3) of a Bowden cable assembly (not shown) therethrough. An upstanding cable winding stop 106 is provided for limiting counterclockwise rotation of winding lever assembly 26, and an upstanding combination stop 110 is provided for limiting clockwise rotation of winding lever assembly 26 and counterclockwise rotation of release lever 40. An elongated opening 114 is provided for receiving a lower end of a mounting axle 118 of positioning pawl 41 therein, and a spring mounting opening 122 is provided for mounting an end 126 of return spring 38 therein. A central opening 127 is provided for receiving support post 78 therethrough. Support opening 127 includes a pair of opposed recesses 127A for engaging corresponding mounting ears 44A of bushing 44 to nonrotatably mount bushing 44 to base plate 22.

As noted above, winding lever assembly 26 comprises an integrally formed winding lever 28, takeup element 30 and positioning ratchet 34. Winding lever 28 steps upwardly from takeup element 30 such that, when shift control device 10 is mounted to handlebar 18, a finger contact portion 29 of winding lever 28 is disposed above handlebar 18. Opposite sides 28A and 28B (FIG. 3) of winding lever 28 abut against cable winding stop 106 and combination stop 110, respectively, to limit the range of motion of winding lever assembly 26. In this embodiment, finger contact portion 29 of winding lever 28 moves within a plane P1 (FIG. 3).

Takeup element 30 is an annular member with a cable winding groove 130 for winding and unwinding inner cable 102. Takeup element 30 defines a central opening 131 for receiving bushing 44 therein so that takeup element 30 is radially and rotatably supported by bushing 44. An upstanding indicator member 138 extends circumferentially along an upper surface 142 of takeup element 30 in close proximity to central opening 131. A plurality of gear indicating indicia (e.g., numerals) are disposed on an upper surface 143 of indicator member 138. An end 132 of return spring 38 is mounted to a spring mounting opening (not shown) on the underside of takeup element 30 so that return spring 38 biases takeup element 30, and thereby winding lever assembly 26, in a clockwise direction.

Positioning ratchet 34 comprises a plurality of circumferentially spaced positioning teeth 134 that project radially outwardly from takeup element 30. The spacing of positioning teeth 134 is such that the distance between adjacent positioning teeth 134 corresponds to the amount of pulling of inner cable 102 required to move the bicycle transmission to successive gear positions. For example, if the bicycle transmission comprises a derailleur, then the spacing of positioning teeth 134 is such that the distance between adjacent positioning teeth 134 corresponds to the amount of pulling of inner cable 102 required to move the derailleur from one sprocket to another.

Figure 3:
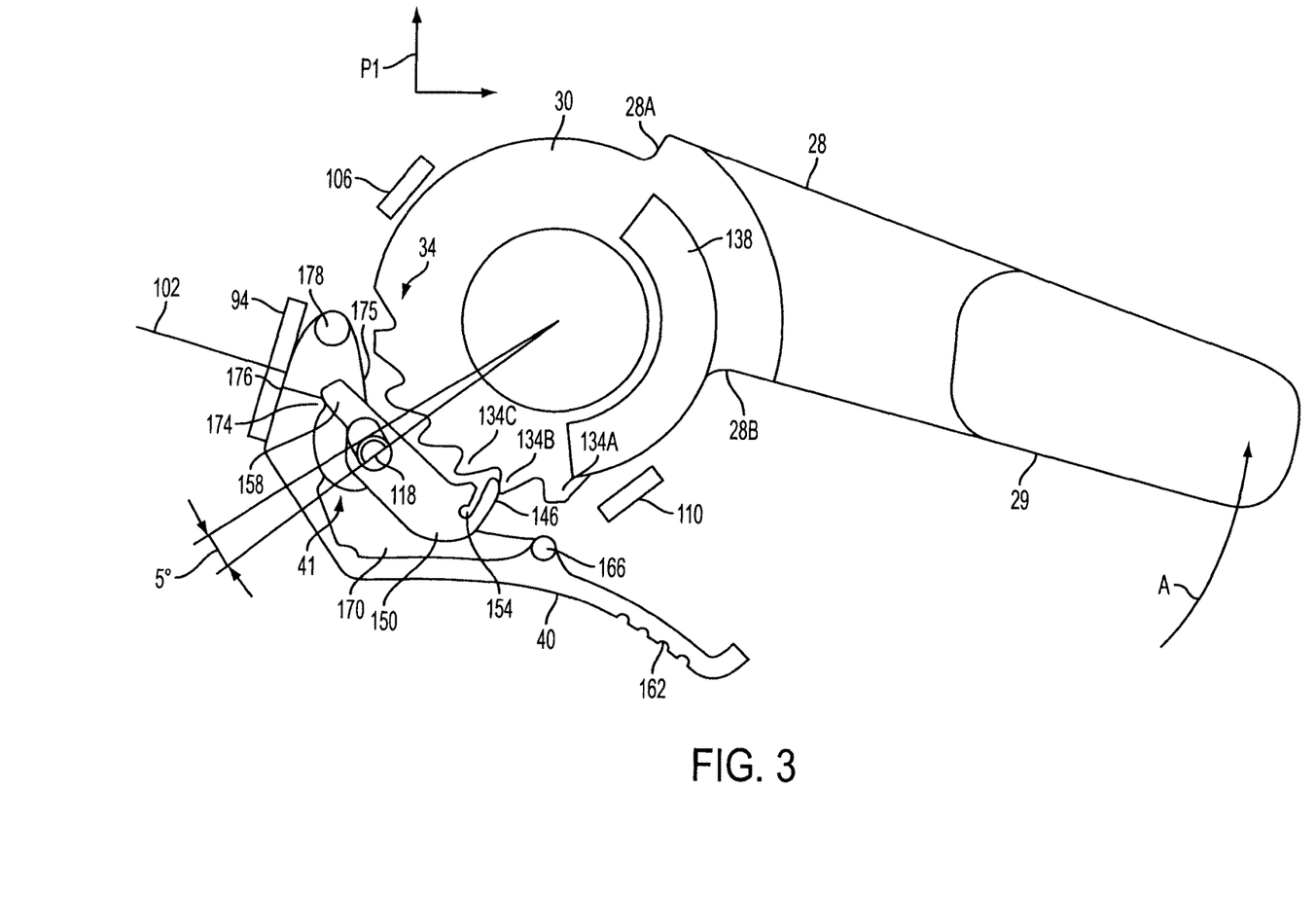
FIG. 3 is a top view of relevant components of the shift control device illustrating a wire winding operation.

As shown more clearly in FIG. 3, positioning pawl 41 comprises a pawl tooth 146 disposed on one end of a pawl body 150 and a control tail 158 disposed on an opposite end of pawl body 150. Pawl tooth 146 engages selective ones of the plurality of positioning teeth 134 to maintain takeup element 30, and hence winding lever 28, in a plurality of positions corresponding to gear positions of the bicycle transmission. A slit 154 is formed between pawl tooth 146 and a radially inner portion of pawl body 150 (relative to mounting axle 118) so that pawl tooth 146 is capable of flexing relative to pawl body 150. This allows pawl tooth 146 to disengage from a currently engaged positioning tooth 134 in the event takeup element 30 is subjected to excessive force in the cable unwinding direction, thereby avoiding damage to the components.

As noted above, the lower end of mounting axle 118 of positioning pawl 41 is mounted within elongated opening 114 in base plate 22. An upper end of mounting axle 118 is mounted in a similar elongated opening (not shown) in cover plate 46. The elongated openings are dimensioned to provide play of approximately 5 degrees of rotation of winding lever assembly 26 before pawl tooth 146 begins to disengage from an engaged ratchet tooth 134. Such play is commonly used to provide a well known overshift function when operating a derailleur transmission. This function will be described in more detail below.

Release lever 40 comprises a finger contact portion 162, a stopper 166 for contacting combination stopper 110 on base plate 22 to limit counterclockwise rotation of release lever 40, a recessed portion 170 for receiving positioning pawl 41 therein during operation, a motion control member 174 extending radially inwardly (relative to support post 78) for contacting control tail 158 of positioning pawl 41 during operation of release lever 40, a motion limiting member 175 extending radially inwardly (relative to support post 78) for contacting selective ones of the plurality of positioning teeth 134 during operation of release lever 40, a clockwise stopper portion 176 for contacting cable guide flange 94 on base plate 22 to limit clockwise rotation of release lever 40, and a release lever axle 178. The lower portion of release lever axle 178 is rotatably mounted to an opening (not shown) in base plate 22, and an upper portion of release lever axle 178 is rotatably mounted to an opening (not shown) in cover plate 46. In this embodiment, finger contact portion 162 of release lever 40 moves in a plane P2 (FIG. 4) that is substantially parallel to plane P1 (FIG. 3).

As noted above, cover plate 46 is attached to base plate 22 by assembly screw 50. When so attached, an opening 182 of an outer casing stopper 186 aligns with cable guide opening 98 in cable guide flange 94, mounting ears 44B of bushing 44 engage corresponding slots (not shown) in cover plate 46, and indicator member 138 on takeup element 30 is disposed in an indicator slot 190 in cover plate 46. Outer casing stopper 186 is used to terminate the outer casing (not shown) of the Bowden cable assembly. When top plate 54 is attached to the top of cover plate 46, a window 194 in top plate 54 is disposed over indicator member 138 such that the gear indicating indicia can be viewed through window 194. For example, if the gear indicating indicia take the form of numerals, than the numeral corresponding to the current transmission gear position will be displayed in window 194.

Operation of shift control device 10 in a wire winding direction is illustrated in FIG. 3. When winding lever 28 is rotated in the counterclockwise direction A, takeup element 30 begins winding inner cable 102, and mounting axle 118 moves from the left end of opening 114 (shown in FIG. 4) to the right end of opening 114 as shown in FIG. 3 before pawl tooth 146 begins to move relative to a positioning tooth 134B. Further rotation of winding lever 28 causes a positioning tooth 134C to press against pawl tooth 146, thus rotating positioning pawl 41 clockwise until pawl tooth 146 passes over positioning tooth 134C and engages the clockwise side of positioning tooth 134C.

As noted above, if the bicycle transmission comprises a derailleur, then the spacing between adjacent positioning teeth 134 is such that inner cable 102 will be pulled enough to move the derailleur the distance between adjacent sprockets. However, inner cable 102 already was pulled by a certain amount before pawl tooth 146 began to move away from positioning tooth 134B. Thus, by the time pawl tooth 146 passes over positioning tooth 134C, inner cable 102 has been pulled by an amount greater than required to move the derailleur from the originating sprocket to the destination sprocket. As a result, the derailleur moves the chain slightly beyond the destination sprocket. As is well known in the art, this helps to ensure that the chain reliably engages the destination sprocket. When the rider removes the rotational force from winding lever 28, axle 118 of positioning pawl 41 moves back to the left end of opening 114, thus allowing takeup element 30 to slightly unwind inner cable 102 so that the derailleur moves back to align the chain with the destination sprocket.

Figure 4:
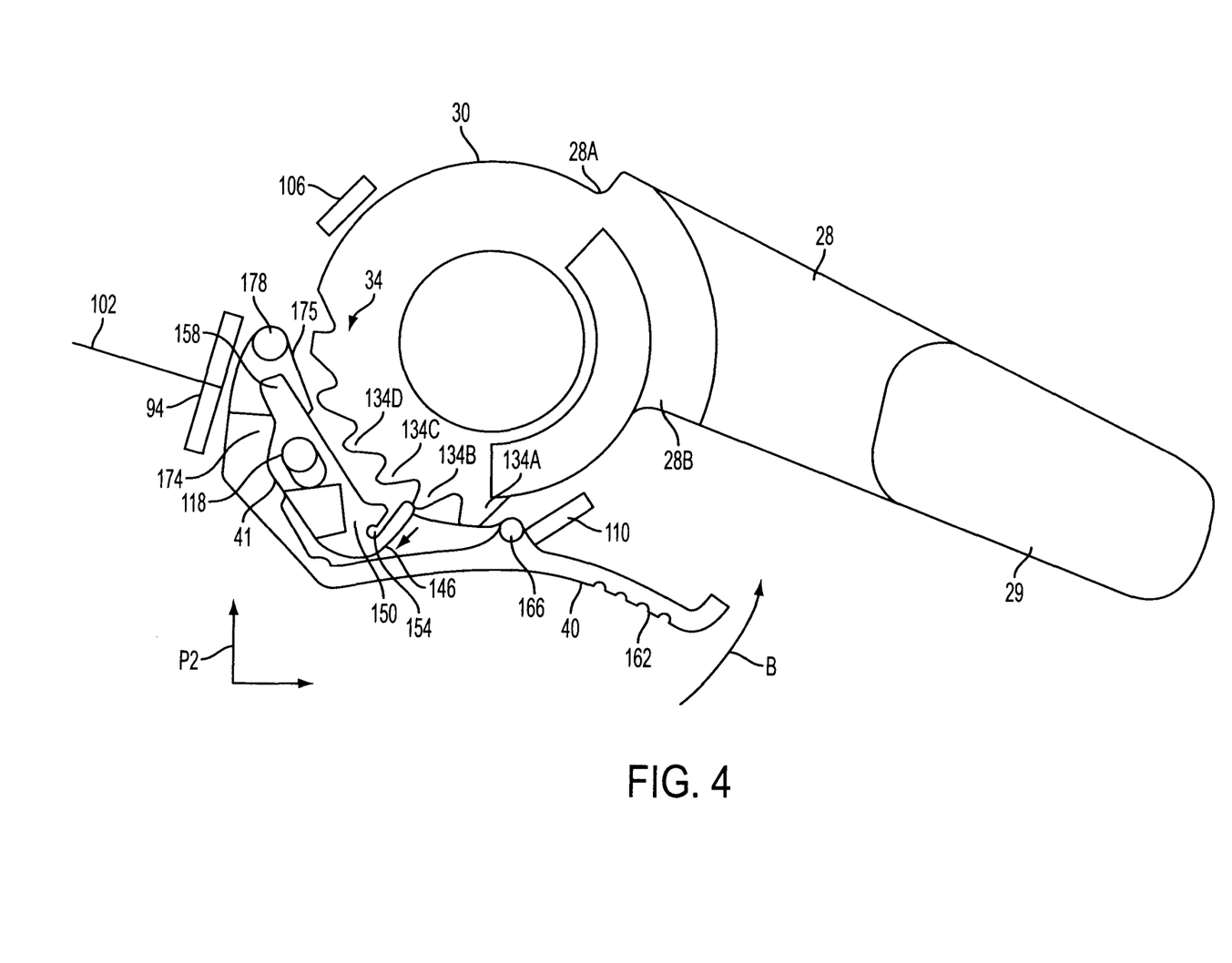
FIG. 4 is a top view of relevant components of the shift control device illustrating a wire unwinding operation.

Operation of shift control device 10 in the wire unwinding direction is illustrated in FIG. 4. When release lever 40 is rotated in the counterclockwise direction B from the rest position shown in FIG. 3 to an operating position shown in FIG. 4, motion control member 174 presses against control tail 158 of positioning pawl 41, thus rotating positioning pawl 41 clockwise. When pawl tooth 146 of positioning pawl 41 clears the tip of positioning tooth 134B, winding lever 28 rotates clockwise as a result of the clockwise biasing force of return spring 38 (alone or in combination with any biasing force of the bicycle transmission). Thereafter, motion limiting member 175 abuts against a positioning tooth 134D to avoid uncontrolled rotation of winding lever 28. When the rider removes the counterclockwise rotational force from release lever 40, motion control member 174 releases the pressure against control tail 158 of positioning pawl 41, thus allowing positioning pawl 41 to rotate counterclockwise in accordance with the counterclockwise biasing force of pawl bias spring 42. Motion limiting member 175 on release lever 40 and pawl tooth 146 of positioning pawl 41 are structured such that pawl tooth 146 enters the space between positioning teeth 134A and 134B before motion limiting member 175 disengages from positioning tooth 134D. As a result, pawl tooth 146 abuts against positioning tooth 134A to prevent further rotation of takeup element 30 shortly after motion limiting member 175 disengages from positioning tooth 134D, and takeup element 30 positions inner cable 102 to place the bicycle transmission in the desired gear.

Figure 5:
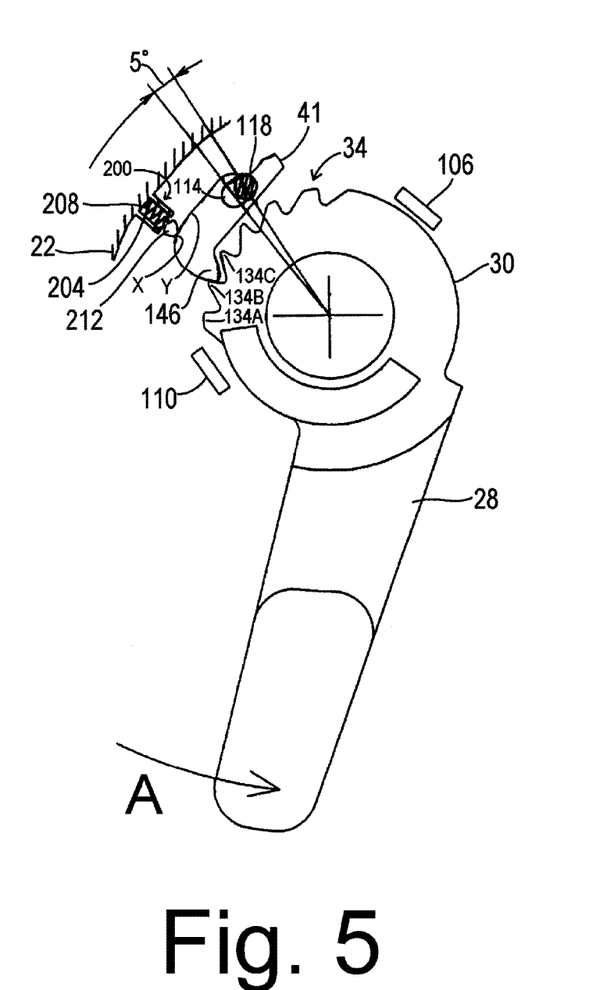
FIG. 5 is a top view of relevant components of the shift control device illustrating an alternative embodiment of a pawl biasing mechanism.

FIG. 5 is a top view of another embodiment of a biasing mechanism for positioning pawl 41, indicated at 200. This embodiment generally illustrates an apparatus for reducing an engaging force of an engaging member for a bicycle component. In this case, positioning pawl 41 functions as a first engaging member, and positioning ratchet 34 functions as a movable second engaging member. This embodiment shares many features of the first embodiment, so the same components share the same reference numbers, and other components that are the same as the first embodiment are omitted.

Figure 6A:
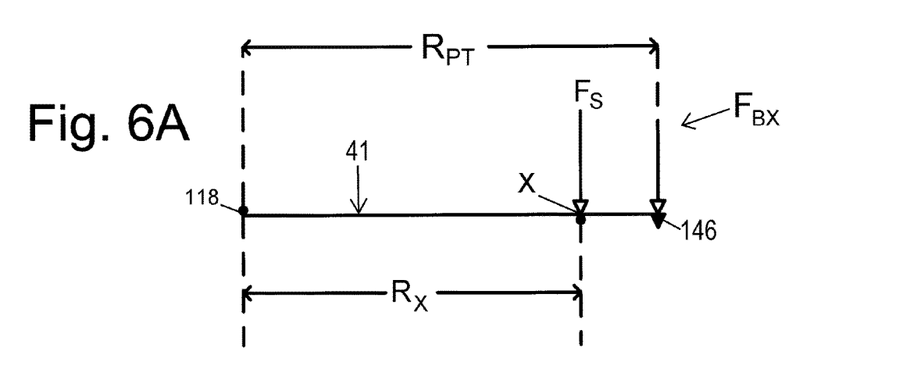
FIG. 6A is a schematic diagram illustrating biasing forces when the shift control device is in a nonoperating position.

As shown in FIG. 5, biasing mechanism 200 comprises a cylindrical spring support sleeve 204 that is integrally formed with base plate 22, a pawl bias spring 208 in the form of a coil spring fitted within spring support sleeve 204, and a bias interface member 212 attached to or otherwise supported by pawl bias spring 208 for pressing against positioning pawl 41. When winding lever 28 is in the nonoperating position shown in FIG. 5, bias interface member 212 contacts positioning pawl 41 at a bias location X (an example of a first biasing location) positioned between mounting axle 118 and the location where pawl tooth 146 of positioning pawl 41 engages ratchet 34, and the engaging force applied to positioning ratchet 34 by pawl tooth 146 is determined by the spring biasing force of pawl bias spring 208 and the distance between mounting axle 118 of positioning pawl 41 and the bias location X. More specifically, as shown in FIG. 6A, if the engaging force applied to positioning ratchet 34 by pawl tooth 146 in this situation is designated $F_{BX}$, the spring biasing force of pawl bias spring 208 is designated $F_S$, the distance between mounting axle 118 and pawl tooth 146 is designated $R_{PT}$, and the distance between mounting axle 118 and the bias location X is designated $R_X$, then $F_{BX} \times R_{PT} = F_S \times R_X$, or $F_{BX} = F_S \times (R_X/R_{PT})$.

Figure 6B:
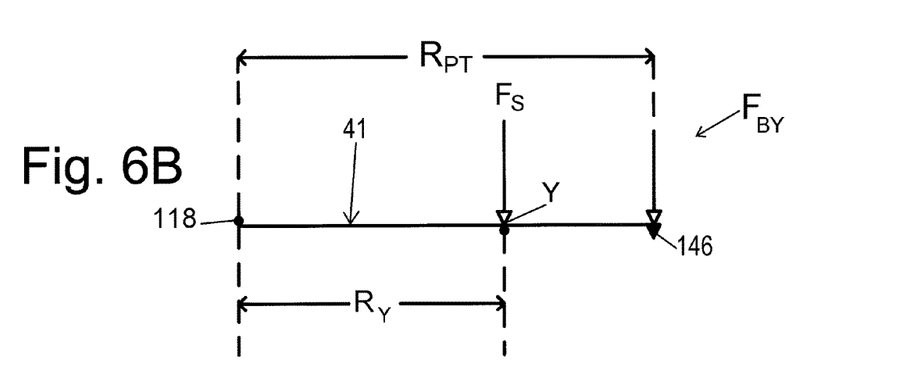
FIG. 6B is a schematic diagram illustrating biasing forces during operation of the winding lever.

When winding lever 28 is rotated in the counterclockwise direction A, takeup element 30 begins winding inner cable 102, and mounting axle 118 moves from the right end of opening 114 shown in FIG. 5 to the left end of opening 114 before pawl tooth 146 begins to move relative to a positioning tooth 134B in the same manner discussed previously. Since positioning pawl 41 moves together with mounting axle 118, positioning pawl 41 moves relative to bias interface member 212 until bias interface member 212 contacts positioning pawl 41 at a bias location Y (an example of a second biasing location) positioned between mounting axle 118 and the location where pawl tooth 146 of positioning pawl 41 engages ratchet 34. At this time, the biasing force of pawl bias spring 208 and the distance between mounting axle 118 of positioning pawl 41 and the bias location Y determine the engaging force applied to positioning ratchet 34 by pawl tooth 146. More specifically, as shown in FIG. 6B, if the engaging force applied to positioning ratchet 34 by pawl tooth 146 in this situation is designated $F_{BY}$, and if the distance between mounting axle 118 and the bias location Y is designated $R_Y$, then $F_{BY} \times R_{PT} = F_S \times R_Y$, or $F_{BY} = F_S \times (R_Y/R_{PT})$. Since $F_S = F_{BX} \times (R_{PT}/R_X)$, then $F_{BY} = F_{BX} \times (R_Y/R_X)$. Since $R_Y$ is less than $R_X$, then $F_{BY}$ is correspondingly less than $F_{BX}$. Thus, when pawl tooth 146 slides over the inclined portion of positioning tooth 134C, the frictional force between pawl tooth 146 and positioning tooth 134C is less than the frictional force that would have been produced if bias interface member 212 continued pressing against positioning pawl 41 at bias location X, and the force needed to rotate winding lever 28 is correspondingly reduced.

Further rotation of winding lever 28 causes pawl tooth 146 to pass over positioning tooth 134C and engage the clockwise side of positioning tooth 134C. When the rider removes the rotational force from winding lever 28, axle 118 of positioning pawl 41 moves back to the right end of opening 114 as noted previously. As a result, bias interface member 212 again contacts positioning pawl 41 at a bias location X, and positioning tooth 146 provides the correspondingly increased engaging force to ratchet member 34. Because of the cooperation between axle (118) of pawl (41) and slot (114) in base plate (22) in this embodiment, the movement of pawl (41) is limited such that the biasing force provided by pawl bias spring (208) and bias interface member (212) is always applied to pawl (41), e.g., between bias locations (X) and (Y), inclusive, as ratchet (34) moves through the entire range of operating movement of ratchet (34) in the first and second directions. Furthermore, in this embodiment, biasing force that biases pawl (41) towards ratchet (34) is the only biasing force applied to pawl (41) other than biasing forces applied from ratchet (34) towards pawl (41).

Figure 7:
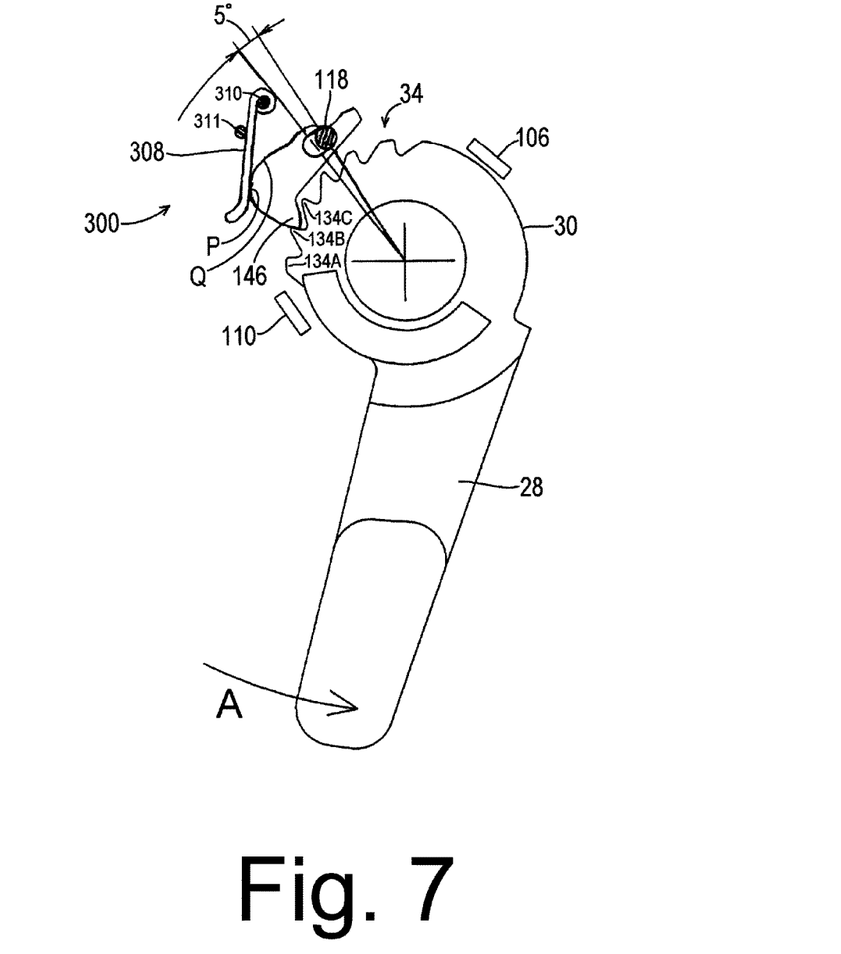
FIG. 7 is a top view of relevant components of the shift control device illustrating another alternative embodiment of a pawl biasing mechanism.

FIG. 7 is a top view of another embodiment of a biasing mechanism for positioning pawl 41, indicated at 300. In this embodiment, biasing mechanism 300 comprises a pawl bias spring 308 in the form of a leaf spring mounted to base plate 22 through a mounting post 310. A motion limiting pin 311 abuts against the back side of pawl bias spring 308 to prevent pawl bias spring 308 from rotating clockwise and thereby ensuring that pawl bias spring 308 applies a proper biasing force to positioning pawl 41. When winding lever 28 is in the nonoperating position shown in FIG. 7, pawl bias spring 308 contacts positioning pawl 41 at a bias location P, and the engaging force applied to positioning ratchet 34 by pawl tooth 146 is determined by the spring biasing force of pawl bias spring 308 and the distance between mounting axle 118 of positioning pawl 41 and the bias location P.

When winding lever 28 is rotated in the counterclockwise direction A, takeup element 30 begins winding inner cable 102, and mounting axle 118 moves from the right end of opening 114 shown in FIG. 7 to the left end of opening 114 before pawl tooth 146 begins to move relative to a positioning tooth 134B in the same manner discussed above. Since positioning pawl 41 moves together with mounting axle 118, positioning pawl 41 moves relative to pawl bias spring 308 until pawl bias spring 308 contacts positioning pawl 41 at a bias location Q. At this time, the biasing force of pawl bias spring 308 and the distance between mounting axle 118 of positioning pawl 41 and the bias location Q determine the engaging force applied to positioning ratchet 34 by pawl tooth 146. Since this distance is less than the distance between mounting axle 118 of positioning pawl 41 and the bias location P, the applied torque on positioning pawl 41 is correspondingly less, and the engaging force applied by pawl tooth 146 to positioning ratchet 34 is reduced. When winding lever 28 returns to the nonoperating position, pawl bias spring 308 again contacts positioning pawl 41 at bias location P with the corresponding increase in engaging force.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for reducing an engaging force of an engaging member for a bicycle component comprising:
   a mounting member;
   a first engaging member;
   a movable second engaging member that moves relative to the mounting member in a first direction and in a second direction opposite the first direction;
   wherein the first engaging member engages the second engaging member; and
   a biasing mechanism that applies a biasing force to the first engaging member at a first biasing location on the first engaging member so that the first engaging member engages the second engaging member;
   wherein, while the first engaging member engages the second engaging member and the second engaging member moves, the biasing mechanism changes the location of the application of the biasing force from the first biasing location on the first engaging member to a different second biasing location on the first engaging member so that an engaging force applied between the first engaging member and the second engaging member when the biasing mechanism applies the biasing force to the second biasing location is less than the engaging force applied between the first engaging member and the second engaging member when the biasing mechanism applies the biasing force to the first biasing location; and
   wherein the biasing force is always applied to the first engaging member as the second engaging member moves through the entire range of operating movement of the second engaging member in the first and second directions.

2. The apparatus according to claim 1 wherein the second engaging member comprises a positioning unit for a bicycle shift control device.

3. The apparatus according to claim 2 wherein the first engaging member comprises a positioning member that engages the positioning unit and maintains the positioning unit in a selected position stationary relative to the mounting member.

4. The apparatus according to claim 3 wherein the biasing mechanism applies the biasing force to the positioning member.

5. The apparatus according to claim 4 wherein the positioning member and the biasing mechanism move relative to each other to reduce the engaging force when the positioning unit moves.

6. The apparatus according to claim 5 wherein the positioning member moves in response to movement of the positioning unit.

7. The apparatus according to claim 6 wherein the positioning member moves relative to the biasing mechanism when the positioning unit moves so that the biasing mechanism applies the biasing force to the different second biasing location.

8. The apparatus according to claim 7 wherein the positioning member moves together with the positioning unit when the positioning unit moves.

9. The apparatus according to claim 8 wherein movement of the positioning member causes the biasing mechanism to apply the biasing force to the different second biasing location.

10. The apparatus according to claim 6 wherein the positioning unit comprises a plurality of positioning teeth, and wherein the positioning member comprises a positioning pawl that engages selected ones of the plurality of positioning teeth and maintains the positioning unit in the selected position stationary relative to the mounting member.

11. The apparatus according to claim 10 wherein the positioning unit and the positioning pawl move relative to each other so that the positioning pawl moves over at least one of the plurality of positioning teeth, and wherein the biasing mechanism applies the biasing force to the different second biasing location so that the engaging force is reduced when the positioning member moves over the at least one of the plurality of positioning teeth.

12. The apparatus according to claim 11 wherein the biasing mechanism increases the engaging force of the positioning member after the positioning member moves over the at least one of the plurality of positioning teeth.

13. The apparatus according to claim 12 wherein the biasing mechanism applies the biasing force to substantially the same biasing location before and after the positioning member moves over the at least one of the plurality of positioning teeth.

14. The apparatus according to claim 13 wherein the positioning pawl moves relative to the biasing mechanism when the positioning unit moves so that the biasing mechanism applies the biasing force to the different second biasing location.

15. The apparatus according to claim 14 wherein the positioning pawl moves together with the positioning unit when the positioning unit moves.

16. The apparatus according to claim 15 wherein movement of the positioning member causes the biasing mechanism to apply the biasing force to the different second biasing location.

17. The apparatus according to claim 16 wherein the mounting member supports the positioning unit and the positioning pawl, and wherein the biasing mechanism is secured relative to the mounting member.

18. The apparatus according to claim 17 wherein the positioning unit rotates to move the positioning pawl.

19. The apparatus according to claim 18 wherein the biasing mechanism comprises a spring.

20. The apparatus according to claim 19 wherein the biasing mechanism comprises a coil spring.

21. The apparatus according to claim 19 wherein the biasing mechanism comprises a leaf spring.

22. The apparatus according to claim 6 wherein the positioning member moves around a rotational axis of the positioning unit in response to movement of the positioning unit.

23. The apparatus according to claim 1 wherein movement of the second engaging member causes the biasing mechanism to reduce the engaging force of the first engaging member.

24. The apparatus according to claim 1 wherein the engaging force changes from a first value to a second value while the second engaging member is moving and the first engaging member is contacting the second engaging member.

25. The apparatus according to claim 1 wherein biasing force that biases the first engaging member towards the second engaging member is the only biasing force applied to the first engaging member other than biasing forces applied from the second engaging member towards the first engaging member.

26. The apparatus according to claim 1 wherein the first engaging member pivots around an axle coupled to the first engaging member, and wherein at least one of the first biasing location or the second biasing location is positioned between the axle and the location where the first engaging member engages the second engaging member.

27. The apparatus according to claim 26 wherein the distance from the axle to the first biasing location is different from the distance from the axle to the second biasing location.

28. The apparatus according to claim 1 further comprising an operating member that is contacted and moved by a user, wherein the operating member is operatively coupled to the second engaging member to move the second engaging member, and wherein, while the first engaging member engages the second engaging member and the second engaging member moves, the biasing mechanism changes the location of the application of the biasing force from the first biasing location on the first engaging member to a different second biasing location on the first engaging member so that the engaging force applied between the first engaging member and the second engaging member when the biasing mechanism applies the biasing force to the second biasing location is less than the engaging force applied between the first engaging member and the second engaging member when the biasing mechanism applies the biasing force to the first biasing location so that the force required to move the operating member decreases.

29. The apparatus according to claim 28 wherein the operating member comprises a lever.

30. The apparatus according to claim 1 wherein the first engaging member comprises a positioning pawl including a pawl tooth, wherein the second engaging member comprises a positioning unit including a plurality of positioning teeth, wherein the pawl tooth engages selected ones of the plurality of positioning teeth to maintain the positioning unit in a selected position stationary relative to the mounting member, and wherein the biasing mechanism always biases the pawl tooth towards the plurality of positioning teeth as the second engaging member moves through the entire range of operating movement of the second engaging member in the first and second directions.

31. The apparatus according to claim 30 wherein the positioning pawl pivots around an axle coupled to the positioning pawl, and wherein the distance from the axle to the first biasing location is different from the distance from the axle to the second biasing location.

32. The apparatus according to claim 31 wherein the distance from the axle to the first biasing location is greater than the distance from the axle to the second biasing location.

33. The apparatus according to claim 32 wherein the positioning pawl moves together with the plurality of positioning teeth when the second engaging member moves to thereby cause the biasing mechanism to apply the biasing force to the different second biasing location.

* * * * *